United States Patent
Fukuda et al.

(10) Patent No.: US 9,500,754 B2
(45) Date of Patent: Nov. 22, 2016

(54) NEUTRON SCINTILLATOR AND NEUTRON DETECTOR

(71) Applicant: Tokuyama Corporation, Yamaguchi (JP)

(72) Inventors: Kentaro Fukuda, Yamaguchi (JP); Hiroaki Saito, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 0 days.

(21) Appl. No.: 15/031,756

(22) PCT Filed: Oct. 28, 2014

(86) PCT No.: PCT/JP2014/078659
§ 371 (c)(1),
(2) Date: Apr. 25, 2016

(87) PCT Pub. No.: WO2015/064587
PCT Pub. Date: May 7, 2015

(65) Prior Publication Data
US 2016/0266262 A1   Sep. 15, 2016

(30) Foreign Application Priority Data
Oct. 28, 2013   (JP) .................................. 2013-222999

(51) Int. Cl.
*G01T 3/06*   (2006.01)

(52) U.S. Cl.
CPC ...................................... *G01T 3/06* (2013.01)

(58) Field of Classification Search
CPC ........... G01T 3/06; G01T 1/00; G01T 1/201; G01T 1/203; G01T 1/06; G01T 1/202; G01T 7/00
USPC ..................................................... 250/390.11
See application file for complete search history.

(56) References Cited

U.S. PATENT DOCUMENTS 4,620,939 A * 11/1986 Maeda ..................... G21K 4/00
                                                              250/361 R
8,044,367 B2   10/2011 Yoshikawa et al.
(Continued)

FOREIGN PATENT DOCUMENTS

JP   200724629 A   2/2007
JP   200770496 A   3/2007
(Continued)

OTHER PUBLICATIONS

Sugimoto, D. et al.: "Study on neutron detector using a rubber dispersing small pieces of LiCaAlF6 scintillator", Dai 74 Kai The Japan Society of Applied Physics Shuki Gakujutsu Koenkai Koen Yokoshu, Sep. 16, 2013.
(Continued)

*Primary Examiner* — David J Makiya
*Assistant Examiner* — Taeho Jo
(74) *Attorney, Agent, or Firm* — Cahn & Samuels, LLP

(57) ABSTRACT

A neutron scintillator includes a resin composition having a resin and an inorganic phosphor containing at least one kind of neutron-capturing isotope that is selected from lithium 6 and boron 10 such as Eu:LiCaAlF$_6$. The resin composition contains $0.2\text{-}30 \times 10^{18}$ atom/mm$^3$ of lithium 6 and $0.05\text{-}8 \times 10^{18}$ atom/mm$^3$ of boron 10 and is in such a form that the average diameter of inscribed spheres is 5 mm or less. A neutron scintillator is formed of a resin-based composite having a plurality of parts formed of the aforesaid resin composition and supplementing part(s), in which the content of the neutron-capturing isotope is not more than ½ of the content of the neutron-capturing isotope in the resin composition. The ratio of the distance between the centers of inscribed spheres in the individual parts formed of the resin composition to the sum of the diameters of the inscribed spheres therein is 1.2 or greater.

8 Claims, 11 Drawing Sheets

(56) References Cited

U.S. PATENT DOCUMENTS

| | | | | |
|---|---|---|---|---|
| 2004/0104356 | A1* | 6/2004 | Bross | G01T 3/06 250/486.1 |
| 2005/0205798 | A1* | 9/2005 | Downing | G01T 1/167 250/390.11 |
| 2005/0208290 | A1* | 9/2005 | Patel | C09K 11/06 428/323 |
| 2006/0054863 | A1* | 3/2006 | Dai | B82Y 10/00 252/301.4 R |
| 2007/0295915 | A1 | 12/2007 | Kramer et al. | |
| 2009/0166585 | A1* | 7/2009 | Bourret-Courchesne | C09K 11/7773 252/301.4 H |
| 2009/0236530 | A1* | 9/2009 | Bell | C08G 77/56 250/362 |
| 2009/0242784 | A1 | 10/2009 | Kraemer et al. | |
| 2011/0024635 | A1* | 2/2011 | Shah | G01T 1/202 250/362 |
| 2011/0111233 | A1* | 5/2011 | Tsukada | C09K 11/02 428/404 |
| 2011/0233420 | A1* | 9/2011 | Feller | G01T 3/00 250/391 |
| 2012/0153243 | A1* | 6/2012 | Vogt | C09K 11/04 252/646 |
| 2013/0112885 | A1* | 5/2013 | Takahashi | C09K 11/7734 250/367 |
| 2014/0014846 | A1 | 1/2014 | Kaneko et al. | |
| 2015/0355346 | A1* | 12/2015 | Weston | G01T 3/06 250/483.1 |

FOREIGN PATENT DOCUMENTS

| | | |
|---|---|---|
| JP | 2007517949 A | 7/2007 |
| WO | 2009119378 A1 | 10/2009 |
| WO | 2012133796 A1 | 10/2012 |

OTHER PUBLICATIONS

International Preliminary Report on Patentability, PCT/JP2014/078659 dated May 12, 2016.
English Abstract of JP 2007517949, Jul. 5, 2007.
English Abstract of WO 2012133796, Oct. 4, 2012.
English Abstract of JP 200724629. Feb. 1, 2007.
English Abstract of JP 200770496, Mar. 22, 2007.
English Asbtract of WO 2009119378, Oct. 1, 2009.

\* cited by examiner

NEUTRON SCINTILLATOR AND NEUTRON DETECTOR

This application is a U.S. national stage application of PCT/JP2014/078659 filed on 28 Oct. 2014 and claims priority to Japanese patent document 2013-222999 filed on 28 Oct. 2013, the entireties of which are incorporated herein by reference.

TECHNICAL FIELD

The present invention relates to a neutron scintillator and a neutron detector using said neutron scintillator. Specifically, the present invention relates to a novel neutron scintillator and neutron detector having high neutron detection efficiency, and capable of accurately counting the neutron in a field with high dose of γ ray as the background noise.

BACKGROUND OF THE INVENTION

The neutron detector is an elemental technology which supports the technology using neutrons, and along with the development of the technology using neutrons in the security field such as cargo inspection or so, the academic research filed such as the structural analysis by a neutron diffraction or so, a nondestructive inspection, or the medial filed such as boron neutron capture therapy or so, the neutron detector having higher performance is in demand.

As the important characteristic which is required for the neutron detector, the neutron detection efficiency and the discrimination ability between neutrons and γ ray (hereinafter, it may be referred as n/γ discrimination ability) are mentioned. The neutron detection ability refers to the ratio of the numbers of neutrons counted by the detector with respect to the number of neutron entered in the detector; and if the neutron detection efficiency is low, the absolute numbers of neutrons being counted will decline, hence the counting accuracy will decline. Also, γ ray exist as a natural radiation, and further it is generated when neutrons contact with the constituting member of the detector system for detecting neutrons or when neutrons contact the inspection objects; thus if the n/γ discrimination ability is low and γ ray is counted as neutrons, then the neutron counting accuracy will decline.

In case of detecting neutrons, since neutron has strong force to transmit through the material without causing any mutual interaction in the substance, it is generally detected using the neutron capture reaction. For example, helium 3 detector is conventionally known which detects using proton and tritium generated by a neutron capture reaction between helium 3 and neutrons. This neutron detector is a proportional counter tube filled with helium 3 gas which has high detection efficiency and excellent n/γ discrimination ability; however helium 3 is expensive substance and furthermore the resources are limited.

Recently, instead of the above mentioned helium 3 detector, the neutron detector using the neutron scintillator has been developed. The neutron scintillator refers to the substance which emits fluorescent light when neutrons enter due to the effect of said neutrons, and by combining with the photodetector such as a photomultiplier tube or so with the neutron scintillator, the neutron detector can be made. Note that, the aforementioned various performances of the neutron detector using said neutron scintillator depends on the substance constituting the neutron scintillator. For example, if large amount of the isotope having high neutron capture reaction efficiency is comprised, then the detection efficiency against neutrons will be enhanced. As such isotope, lithium 6 or boron 10 or so may be mentioned (for example, the patent document 1).

In said neutron detector, the photodetector will detect the light emitted from the neutron scintillator, and the pulse form signal will be output from the photodetector. In general, the numbers of neutrons are measured by the intensity of the pulse form signal so called a pulse-height. That is, for said pulse-height, a predetermined threshold is set, and the event showing the pulse-height higher than said threshold is counted as the neutron incident event; on the other hand the event showing the pulse-height lower than the threshold is considered as a noise. Therefore, in order to enhance n/γ discrimination ability, it is important to reduce the pulse-height generated by γ ray incident.

PRIOR ART

[Patent Article 1] WO 2009/119378

The neutron detector using said neutron scintillator has an advantage that the detection efficiency against neutrons is high, however it is also sensitive against γ ray, and thus n/γ discrimination ability is low.

The present invention is made to solve such problems, and the object is to provide the neutron detector having excellent neutron counting accuracy capable of accurately counting neutrons even in the field with high dose of γ ray as the background noise.

SUMMARY OF THE INVENTION

The present inventors have carried out keen examination to obtain the neutron scintillator having excellent neutron detection efficiency and n/γ discrimination ability by using inorganic phosphor particles comprising at least one neutron-capturing-isotope selected from lithium 6 and boron 10. As a result, the present inventors have come up with an idea to form the shape of said inorganic phosphor to particle form, and to use the resin composition mixing said inorganic phosphor particles and resin as the neutron scintillator. Also, the present inventors have found that by making the shape of the resin composition to have the average diameter of inscribed sphere of 5 mm or less, good n/γ discrimination ability can be obtained. Further, in case the neutron scintillator comprises plurality of said resin compositions, by having the resin based complex wherein the plurality of resin compositions are arranged so to satisfy the ratio of the distance between the centers of two inscribed spheres against the sum of the diameters of two inscribed spheres of 1.2 or more, the neutron scintillator with excellent neutron detection efficiency while having excellent n/γ discrimination ability can be obtained.

That is, according to the present invention, a neutron scintillator comprising a resin composition having a resin, and inorganic phosphor particles having at least one neutron-capturing-isotope selected from the group consisting of lithium 6 and boron 10, wherein a content of lithium 6 and boron 10 are 0.2 to $30 \times 10^{18}$ atom/mm$^3$ and 0.05 to $8 \times 10^{18}$ atom/mm$^3$ respectively; and the resin composition has a shape so that an average diameter of inscribed spheres is 5 mm or less is provided.

Also, a neutron scintillator comprising a resin based complex comprising a part formed of the resin composition, and a supplementing part of which a content of said neutron-capturing-isotope is ½ or less of said resin composition; and the parts formed of the resin composition are present in plurality, and for each resin composition, in the combination of the part formed of the resin composition and the part formed of another resin composition closest to said resin composition, the ratio of the distance between the centers of two inscribed spheres against the sum of the diameters of two inscribed spheres is 1.2 or more in average value, is provided.

In said neutron scintillator, a ratio of a refractive index of a resin constituting the resin composition with respect to the refractive index of the inorganic phosphor particle is preferably within a range of 0.95 to 1.05.

Also, in said neutron scintillator, a ratio of a refractive index of a supplementing part with respect to the refractive index of the resin constituting the resin composition is preferably within a range of 0.90 to 1.10; and the supplementing part preferably comprises substantially the same resin as the resin constituting the resin composition.

Also, according to the present invention, a neutron detector comprising said neutron scintillator and said photodetector is provided.

According to the present invention, the neutron scintillator having excellent neutron detection efficiency and n/γ discrimination ability can be provided, and the neutron detector using said neutron scintillator can be provided. Said neutron detector can accurately count neutrons even in a flied with high dose of γ ray as the background noise, hence it can be suitably used in the security field such as cargo inspection or so, the academic research filed such as the structural analysis by neutron diffraction or so, a nondestructive inspection, or the medial filed such as boron neutron capture therapy or so.

DETAILED DESCRIPTION OF THE INVENTION

Figure 1:
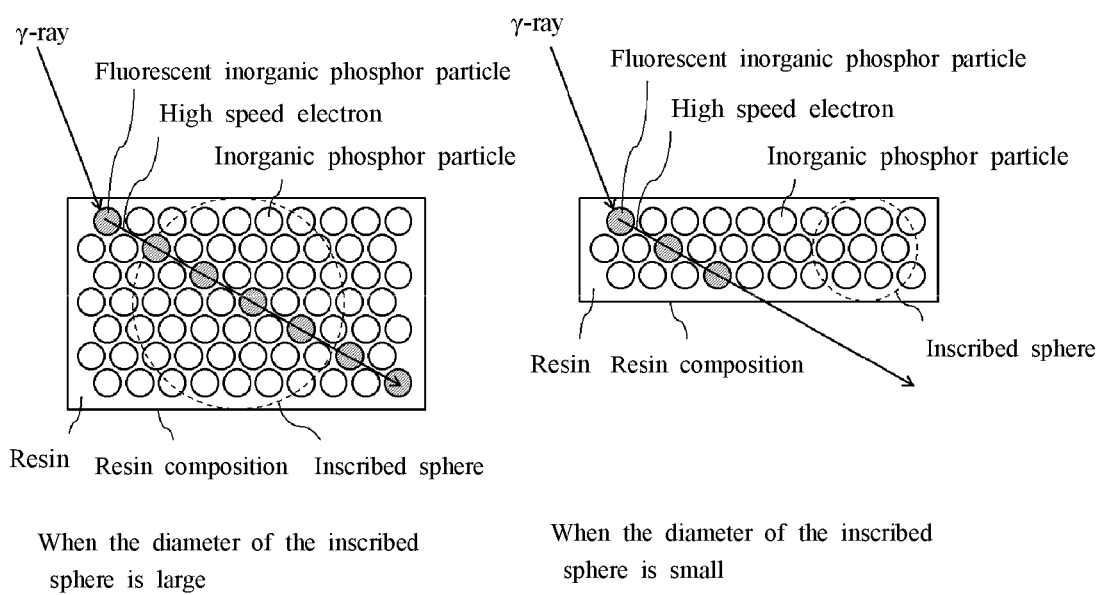
FIG. 1 is the schematic diagram showing the mechanism of the present invention.

The scintillator of the present invention comprises the inorganic phosphor particle comprising at least one neutron-capturing-isotope selected from the group consisting of lithium 6 and boron 10 (hereinafter, it may be simply referred as "inorganic phosphor particle") as the first constituting element.

In the inorganic phosphor particle, due to the neutron capture reaction between lithium 6 or boron 10 with neutrons, α ray and tritium or α ray and lithium 7 (hereinafter, it may be referred as secondary particle) are generated; and the energy of 4.8 MeV or 2.3 MeV is provided to the inorganic phosphor particles by said secondary particle respectively. By being provided with such energy, the inorganic phosphor particles are excited, and emit the fluorescence.

The neutron scintillator using said inorganic phosphor particle has high efficiency of neutron capture reaction by lithium 6 and boron 10, hence has the excellent neutron detection efficiency; and also since the energy supplied to the inorganic phosphor particles after the neutron capture reaction is high, also has the excellent fluorescence intensity emitted when detecting neutrons.

Note that, in the present invention, the inorganic phosphor particle is the particle comprising the inorganic material which comprises the neutron-capturing-isotope and emits the fluorescence; but it does not include the mixture particle which the non-fluorescent particles comprising the neutron-capturing-isotope and the fluorescent particle which does not comprise the neutron-capturing-isotope are mixed. Further specifically, for example, the mixture particle mixing non-fluorescent LiF comprising the neutron-capturing-isotope, and the fluorescent ZnS:Ag does not comprise the neutron-capturing-isotope are not included (refer to the example 2 of the patent document 2). In such mixture particle, the energy of the secondary particle generated by the particle comprising the neutron-capturing-isotope will be partially lost before it reaches to the particle emitting the fluorescence. Here, the energy being lost varies depending on the range from the originating point of the secondary particle to the particle emitting the fluorescence; hence as a result, the fluorescence intensity of the particle emitting the fluorescence varies largely. Therefore, desired n/γ discrimination ability cannot be obtained, thus said mixture particle is not used in the present invention.

In the present invention, the content of lithium 6 and boron 10 (hereinafter, it may be referred as a neutron-capturing-isotope content) in the inorganic phosphor particles are preferably $1 \times 10^{18}$ atom/mm$^3$ or more and $0.3 \times 10^{18}$ atom/mm$^3$ or more respectively; and more preferably $6 \times 10^{18}$ atom/mm$^3$ or more and $2 \times 10^{18}$ atom/mm$^3$ or more respectively. Note that, the above mentioned neutron-capturing-isotope content refers to the number of the neutron-capturing-isotope included per 1 mm$^3$ of inorganic phosphor particle. By setting the neutron-capturing-isotope content within above mentioned range, the chances of having the neutron capture reaction by the neutron incident increases, hence the neutron detection efficiency improves.

Said neutron-capturing-isotope content can be regulated appropriately by regulating the isotope ratio of lithium 6 and boron 10 in lithium fluoride (LiF) or boron oxide ($B_2O_3$) or so which is used as the source material of the inorganic phosphor particles. Here, the isotope ratio is the element ratio of lithium 6 isotope against the entire lithium element, and the element ratio of boron 10 isotope against entire boron element; and in case of natural lithium and boron, it is about 7.6% and 19.9% respectively. As for the method for regulating the neutron-capturing-isotope content, the method of using the general purpose material having the natural isotope ratio as the starting source material, then condensing to the desired isotope ratio of lithium 6 and boron 10; or the method of using the condensed source material having the higher isotope ratio of lithium 6 and boron 10 than the desired isotope ratio, then mixing said condensed source material and said general-purpose source material or so may be mentioned.

On the other hand, although the upper limit of the neutron-capturing-isotope content is not particularly limited, it is preferably $60 \times 10^{18}$ atom/mm$^3$ or less. In order to attain the neutron-capturing-isotope content exceeding $60 \times 10^{18}$ atom/mm$^3$, it would be necessary to use a large amount of special source material wherein the neutron-capturing-isotope content is condensed to high concentration; thus the production cost becomes extremely high, and also the choice of the type of inorganic phosphor particles will be very limited.

Note that, the content of lithium 6 ($C_{Li, P}$) and boron 10 ($C_{B, P}$) in the above mentioned inorganic phosphor particles can be determined by obtaining, the density of the inorganic phosphor particles, the weight fraction of lithium and boron in the inorganic phosphor particles, and the isotope ratio of lithium 6 and boron 10 in the source material in advance, and then placing these into the formula (1) and the formula (2) as shown in below. Note that, the calculations according to the following formulas (1) and (2) are based on the case wherein the units for the content ($C_{Li, P}$) of lithium 6 and the content ($C_{B, P}$) of boron 10 are "atom/nm$^3$"; however these may be converted to other units depending on the needs.

$$C_{Li,P} = \rho \times W_{Li} \times R_{Li}/(700 - R_{Li}) \times A \times 10^{-23} \quad (1)$$

$$C_{B,P} = \rho \times W_B \times R_B/(1100 - R_B) \times A \times 10^{-23} \quad (2)$$

(In the above formula, $C_{Li, P}$ and $C_{B, P}$ are respectively the content of lithium 6 and the content of boron 10 in the inorganic phosphor particles, $\rho$ is the density [g/cm$^3$] of the inorganic phosphor particles, $W_{Li}$ and $W_B$ are respectively the weight fraction [wt %] of lithium and boron in the inorganic phosphor particles, $R_{Li}$ and $R_B$ are respectively the isotope ratio [%] of lithium 6 and boron 10 in the source material, and A is Avogadro's constant [$6.02 \times 10^{23}$].

Said inorganic phosphor particles are not particularly limited, and the particle form of the conventionally known inorganic phosphors can be used; however for example the inorganic phosphor particles comprising the crystal of Eu:LiCaAlF$_6$, Eu,Na:LiCaAlF$_6$, Eu:LiSrAlF$_6$, Ce:LiCaAlF$_6$, Ce,Na:LiCaAlF$_6$, Ce:LiSrAlF$_6$, Ce:LiYF$_4$, Tb:LiYF$_4$, Eu:LiI, Ce:Li$_6$Gd(BO$_3$)$_3$, Ce:LiCs$_2$YCl$_6$, Ce:LiCs$_2$YBr$_6$, Ce:LiCs$_2$LaCl$_6$, Ce:LiCs$_2$LaBr$_6$, Ce:LiCs$_2$CeCl$_6$, Ce:LiRb$_2$LaBr$_6$ or so; and the inorganic phosphor particles comprising Li$_2$O—MgO—Al$_2$O$_3$—SiO$_2$—Ce$_2$O$_3$ based glass or so may be mentioned.

In the present invention, the wavelength emitted from the inorganic phosphor particles is preferably within near ultraviolet region to visible light region, and more preferably visible light region from the point that transparency can be easily obtained when mixed with the resin which will be described in below.

In the present invention, the neutron-capturing-isotope which is comprised in the inorganic phosphor particles is preferably only lithium 6. By making the neutron-capturing-isotope which contributes to the neutron capture reaction to lithium 6 only, a constant energy can be provided to the inorganic phosphor particles constantly, and also extremely high energy of 4.8 MeV can be provided. Therefore, the neutron scintillator with little variation of the fluorescence intensity and particularly with excellent fluorescence intensity can be obtained.

Among the inorganic phosphor particles only comprising lithium 6 as the neutron-capturing isotope, a colquiriite type crystal expressed by a chemical formula of LiM$^1$M$^2$X$_6$ (note that, M$^1$ is at least one alkaline earth element selected from the group consisting of Mg, Ca, Sr and Ba; M$^2$ is at least one metal element selected from the group consisting of Al, Ga and Sc; X is at least one halogen element selected from the group consisting of F, Cl, Br and I) and comprising at least one lanthanoid element is preferable, and said colquiriite type crystal preferably further comprises at least one alkaline metal element.

As for further specific examples of the colquiriite type crystal, the inorganic phosphor particles comprising Eu:LiCaAlF$_6$, Eu,Na:LiCaAlF$_6$, Eu:LiSrAlF$_6$, and Eu, Na:LiSrAlF$_6$ are most preferable since it has high light yield, does not have deliquescency and is chemically stable.

The present invention uses the inorganic phosphor particles as the constituting element of the neutron scintillator in place of conventional bulk body of the inorganic phosphor in order to improve the n/γ discrimination ability of the neutron scintillator. Hereinafter, the mechanism of improvement of the n/γ discrimination ability by using said inorganic phosphor particle will be explained.

In general, when γ ray enters to the inorganic phosphor, high speed electrons are generated in the inorganic phosphor, then said high speed electrons provide the energy to the inorganic phosphor; thereby the inorganic phosphor emits the light. If the pulse-height output by said light emission is as high as the pulse-height of the incident neutrons, and each are not able to be discriminated, then γ ray is counted as the neutron, thus error occurs in the neutron count. Particularly, in case γ ray dose is high, the error caused by said γ ray increases, hence it becomes a significant problem.

The pulse-height output from the neutron detector by the γ ray incident depends on the energy provided by said high speed electrons, thus by lowering said energy, the pulse-height output when γ ray enters to the neutron scintillator can be reduced.

Here, the range distance of the high speed electrons in the scintillator caused by γ ray incident to the scintillator while providing the energy to the scintillator is several mm or so which is relatively long.

On the contrary, when the neutron enters the scintillator, as described in above, the secondary particle generated by the neutron capture reaction between the neutrons with lithium 6 and boron 10 which are included in the inorganic phosphor of said scintillator provides the energy to the inorganic phosphor, thereby the inorganic phosphor emits the light; however the range of the secondary particle is several μm to several tens μm which is shorter than the high speed electrons.

As for the first characteristic of the present invention, by making the inorganic phosphor into a particle form, the high speed electrons rapidly deviates from the inorganic phosphor particles, thereby the energy provided to the inorganic phosphor from the high speed electrons is lowered.

The size of the inorganic phosphor particles in the present invention is large enough so that almost all of the energy of the secondary particle generated by the neutron incident can be provided to the inorganic phosphor, but small enough that the high speed electrons can deviate by γ ray incident.

According to the examination by the present inventors, the shape of the inorganic phosphor particles preferably has the specific surface area of 50 cm$^2$/cm$^3$ or more, and particularly preferably 100 cm$^2$/cm$^3$ or more. Note that, in the present invention, the specific surface area of the inorganic phosphor particles refers to the surface area per unit volume of the inorganic phosphor particles.

Here, since the specific surface area in the present invention is the surface area per unit volume, therefore (1) it tends to become larger as the absolute volume of the inorganic phosphor particles become smaller, and also (2) in case the shape is a complete sphere, the specific surface area is at the smallest, and on the other hand as the specific surface area of the inorganic phosphor particles becomes lager, the inorganic phosphor particle takes the shape farther away from the complete sphere. For example, when thinking of a cube having the sides extending in X axis direction, Y axis direction and Z axis direction; the specific surface area is smallest when the regular hexahedron has X=Y=Z; and the specific surface area becomes larger when any one of the length in the axis direction is made shorter and other sides are made longer in the axis direction even though the volume is the same.

Further specifically, in case of the regular hexahedron having one side of 0.5 cm, the specific surface area is 12 $cm^2/cm^3$; but in case of the regular hexahedron (0.001 $cm^3$) having one side of 0.1 cm, then the specific surface area thereof is 60 $cm^2/cm^3$. Further, in case the thickness is made to 0.025 cm while the volume (0.001 $cm^3$) is the same, then the width and the height becomes 0.2 cm×0.2 cm, hence the specific surface area is 100 $cm^2/cm^3$.

In other words, when the specific surface area is large, this means that there is a part having at least one length extremely short in the axial direction. Further, the high speed electrons generated by said γ ray which runs in the direction of this short axis direction and in the direction close to this small axis direction quickly deviate from the crystal as mentioned in the above, hence the energy provided to the inorganic phosphor particles from the high speed electrons can be reduced.

The shape of the suitable inorganic phosphor particle based on said specific surface area is found from the above discussed findings and examinations; and when considering the energy provided to the inorganic phosphor particles from the high speed electrons, said specific surface area can be used as the indicator of the shape when taking into consideration that the inorganic phosphor particle takes various particle forms. Practically, said specific surface area is preferably 50 $cm^2/cm^3$ or more, more preferably 100 $cm^2/cm^3$ or more; thereby the neutron detector having excellent n/γ discrimination ability can be obtained.

Note that, in the present invention, the upper limit of said specific surface area is not particularly limited, but preferably it is 1000 $cm^2/cm^3$ or less. When the specific surface area exceeds 1000 $cm^2/cm^3$, that is when the length of at least one axis direction of the inorganic phosphor particles is too small, the secondary particle generated by the neutron capture reaction between neutrons with said lithium 6 and boron 10 may deviate from the inorganic phosphor particles before providing the entire energy to inorganic phosphor particles. In such event, the energy given to the inorganic phosphor particles by the neutron incident declines, thus the light emission intensity of the inorganic phosphor declines. In order to securely provide the entire energy of said secondary particles to the inorganic phosphor particles, and to enhance the light emission intensity of the inorganic phosphor; the specific surface area of the inorganic phosphor particles is particularly preferably 500 $cm^2/cm^3$ or less.

Note that, in the above, the word "axis" is used; however this was just used to show the space coordination position of X, Y and Z; and the inorganic phosphor particle used in the present invention is not to be limited to the cube comprising the sides in the particular axis direction.

Also, in case the inorganic phosphor particle has indefinite shape, said specific surface area can be easily obtained from the density and the specific surface area based on the weight which is obtained by using a density meter and BET specific surface area measuring device.

In the present invention, as the specific examples of the shape of the inorganic phosphor particles suitably used, particles of flat plate form, prism form, columnar form, sphere form or indefinite shape may be mentioned; and the shape having the equivalent spherical diameter in terms of specific surface area of 50 to 1500 μm, particularly preferably 100 to 1000 μm or so may be mentioned. From the point of easy production and easy purchase, those with the indefinite form obtained by pulverizing the bulk body are preferable.

The inorganic phosphor particles having the shape as discussed in the above can be obtained by a sieving. Sieving refers to the method of classification using an upper sieving having predetermined aperture and lower sieving having smaller aperture than the upper sieving; thereby separating the particle which passes through the upper sieving but substantially does not include particle passing through the lower sieving. In such sieving, the particle having shorter length in at least one axis with respect to the aperture of the sieving tends to pass through said sieving. Therefore, the inorganic phosphor particle having the shape wherein the high speed electrons excited by said γ ray can easily deviate is obtained by passing through the upper sieving; and the inorganic phosphor particle having the shape wherein the high speed electrons generated by said γ ray can easily deviate is separated on the lower sieving; further the inorganic phosphor particle having the shape wherein the secondary particle generated by said neutrons can be easily removed.

Specifically, by carrying out the sieving, the inorganic phosphor particles which passes through the aperture of 1000 μm but substantially free of the particle which passes through the aperture of 100 μm are separated; and said inorganic phosphor particles are preferably used for the neutron scintillator. Further, the inorganic phosphor particles which pass through the aperture of 500 μm but substantially free of the particle which passes through the aperture of 100 μm are separated; and said inorganic phosphor particles are preferably used for the neutron scintillator.

The first embodiment of the neutron scintillator of the present invention comprises the resin composition comprising the resin and above discussed inorganic phosphor particles (hereinafter, it may be simply referred as "the resin composition"). As it can be understood from the above discussion, the inorganic phosphor particles of the present invention have small size compared to the generally used inorganic phosphor; hence the inorganic phosphor particles alone have poor neutron detection efficiency. Such problem can be solved by mixing the plurality of the inorganic phosphor particles with the resin, and by dispersing in said resin; thereby the neutron scintillator having excellent neutron detection efficiency while having said excellent n/γ discrimination ability can be obtained.

That is, the neutron detection efficiency of the neutron scintillator of the present invention depends on the content of the neutron-capturing-isotope derived from the inorganic phosphor particles in the resin composition, and the neutron detection efficiency can be enhanced by increasing said content. Note that, said neutron-capturing-isotope content refers to the number of the neutron-capturing-isotope derived from the inorganic phosphor particles included in average per 1 $mm^3$ of the resin composition; and each of the content of lithium 6 ($C_{Li, C}$) and the content of boron 10 ($C_{B, C}$) can be obtained from the following equations (3) and (4) using the content of lithium 6 ($C_{Li, P}$) and the content of boron 10 ($C_{B,P}$) in the inorganic phosphor particles and the volume fraction of the inorganic phosphor particles (V) in the resin composition.

$$C_{Li,C}=C_{Li,P}\times(V/100) \quad (3)$$

$$C_{B,C}=C_{B,P}\times(V/100) \quad (4)$$

(In the above formula, $C_{Li,C}$ and $C_{B,C}$ are respectively the content of lithium 6 and boron 10 in the resin composition, $C_{Li,P}$ and $C_{B,P}$ are respectively the content of lithium 6 and boron 10 in the inorganic phosphor particles, and V is the volume fraction (V) [vol %] of the inorganic phosphor particles in the resin composition)

The content of lithium 6 and boron 10 in said resin composition are respectively $0.2\times10^{18}$ atom/mm³ or more and $0.05\times10^{18}$ atom/mm³ or more; further preferably $0.5\times10^{18}$ atom/mm³ or more and $0.1\times10^{18}$ atom/mm³ or more; and particularly preferably $1\times10^{18}$ atom/mm³ or more and $0.3\times10^{18}$ atom/mm³ or more. By setting the neutron-capturing-isotope content within the above range, the neutron detection efficiency of the neutron scintillator improves.

On the other hand, the upper limit of lithium 6 and boron 10 in the resin composition are respectively $30\times10^{18}$ atom/mm³ or less and $8\times10^{18}$ atom/mm³ or less. In order to achieve the neutron-capturing-isotope content exceeding said upper limit, a large amount of a special source material wherein the neutron-capturing-isotope is condensed to high concentration in advance is used, or it is necessary to significantly increase the volume fraction of the inorganic phosphor particles; hence the cost will become expensive.

The volume fraction of the inorganic phosphor particles in the resin composition of the present invention is not particularly limited, but by increasing the volume fraction of the inorganic phosphor particles in the resin composition, as it is obvious from said equations, the neutron detection efficiency can be improved. Therefore, it is preferable to make the volume fraction of the inorganic phosphor particles in the resin composition to 20 vol % or more, and more preferable to make 40 vol % or more. The upper limit of the volume fraction of the inorganic phosphor particles with respect to the resin composition is not particularly limited, however considering the viscosity or so during the production of the resin composition; it is preferably less than 80 vol %.

Here, as discussed in the above, when the volume fraction of the inorganic phosphor particles in the resin composition is increased in order to improve the neutron detection efficiency, many of the inorganic phosphor particles are close to each other, hence the high speed electrons deviated from one inorganic phosphor particle may incident on other inorganic phosphor particle close thereto, and the energy is provided to the inorganic phosphor particles, thereby the total sum of the light yield increases. Therefore, the pulse-height generated by γ ray incident becomes large, thus it becomes difficult to discriminate the pulse-height of the neutron ray. In order to solve such problem, the shape of said resin composition in the present invention takes the shape wherein the arithmetic average diameter (hereinafter, it will simply referred as the average diameter) of inscribed sphere is 5 mm or less. By having such shape, the secondary electrons generated by γ ray incident will deviate from the resin composition, thus the pulse-height by γ ray can be reduced, thereby the n/γ discrimination ability can be improved (refer to FIG. 1). The average diameter of said inscribed sphere is preferably 2 mm or less and particularly preferably 1 mm or less from the point of particularly improving the n/γ discrimination ability.

Note that, "the inscribed sphere" in the present invention refers to the sphere which is entirely contained within the resin composition, and contacts against the boundary defining the outer shape of the resin composition from inside at plurality of positions; and in case one resin composition has a shape which can have plurality of inscribed spheres with different diameters, the inscribed sphere having the largest diameter among these is used as the inscribed sphere of the resin composition.

When the resin composition has layer form or prism form, the average diameter of the inscribed sphere corresponds to the average thickness thereof, and when the resin composition is columnar form or sphere form, then it corresponds to the average diameter thereof. For other resin compositions having the complicated shape, by setting the average diameter of the inscribed sphere within said ranges, the pulse-height by γ ray can be reduced. Note that, the diameter of the inscribed sphere at each point of the resin composition may vary, however if there is a point which is too thick, the pulse-height of γ ray incident at this point becomes large, and may cause an error in the neutron counting. Therefore, the diameter of the inscribed sphere at each point of the resin composition is preferably within 2 times of the average diameter, and particularly preferably within 1.5 times.

The lower limit of the average diameter of the inscribed sphere is not particularly limited, but it is preferably 0.1 mm or more, and particularly preferably 0.2 mm or more from the point of enhancing the neutron detection efficiency.

In the present invention, in order to efficiently guide the fluorescence emitted from the inorganic phosphor particles in the resin composition to the subsequent photodetector, the resin composition is preferably transparent. By making the resin composition transparent, the pulse-height of the output signal from the photodetector becomes large, and the signal/noise ratio of the neutron detector is improved. Also, the variation of the pulse-height becomes small, hence neutrons and γ ray are easily discriminated by setting said threshold.

In order to make the resin composition transparent, for the resin composition of the present invention which is the second essential component, the internal transmittance of the resin at the light emitting wavelength of said inorganic phosphor particles is preferably 80%/cm or more, and particularly preferably 90%/cm or more.

Note that, in the present invention, the internal transmittance refers to the transmittance excluding the surface reflection loss caused at the surface of the incident side and the emitting side of the resin when the light is transmitted to said resin; and the value is shown in per 1 cm of an optical path length. The internal transmittance per 1 cm of the optical path length (no) can be obtained by measuring the transmittance including the surface reflection loss for each pair of said resin having different thickness, and by placing into the following equation (5).

$$\log(\tau_{10})=\{\log(T_2)-\log(T_1)\}/(d_2-d_1) \quad (5)$$

(In the above equation, $d_1$ and $d_2$ are the thickness in "cm" unit for said pair of resin, and it is $d_2>d_1$. Also, $T_1$ and $T_2$ are the transmittance including the surface reflection loss of the resin having the thickness of $d_1$ and $d_2$ respectively.)

As the specific examples of said resin, a silicone resin, a fluorine resin or so may be mentioned. Poly(meth)acrylate, polycarbonate, polystyrene, polyvinyl toluene and polyvinyl alcohol or so may be mentioned. Also, for the purpose of regulating the refractive index and the intensity, plurality of resins can be mixed for use.

Also, among the resins, the transparent resin wherein the refractive index at the light emitting wavelength of said inorganic phosphor particles close to the refractive index of the inorganic phosphor particles is preferably used. Specifically, the ratio of the refractive index of the resin with respect to the refractive index of the inorganic phosphor particles is preferably 0.95 to 1.05, and particularly preferably 0.98 to 1.02. By setting the ratio of the refractive index within said range, the light scattering at the boundary between the inorganic phosphor particles and the resin can be suppressed, and the transparency of said resin composition can be enhanced. Note that, said refractive index is that of within the temperature range in which the scintillator of the present invention is used. For example, in case of using the scintillator of the present invention at near 100° C., said refractive index ratio needs to be determined at 100° C.

The refractive index at the light emitting wavelength of said inorganic phosphor particles can be measured by using the refractometer. In general, as a light source of the refractometer, d ray (587.6 nm) of He lamp, γ ray (706.5 nm) of the same, F ray (486.1 nm) of $H_2$ lamp, C ray (656.3 nm) of the same, i ray (365.0 nm) of Hg lamp, h ray (404.7 nm) of the same, g ray (435.8 nm) of the same, and e ray (546.1 nm) of the same can be used. Among these light sources, the light source of short wavelength side and long wavelength side than the light emitting wavelength of the inorganic phosphor particles is appropriately selected; then the refractive index measured at the wavelength of each light source and at said wavelength is respectively placed into Sellmeier's equation (6) to obtain the constant A and B. Then, the light emitting wavelength of the inorganic phosphor particles is placed into the same equation thereby the expected refractive index can be obtained. Note that, when the light emitting wavelength of the inorganic phosphor particles matches the wavelength of any one of said light sources, the refractive index may be determined by using the light sources. Also, when measuring such refractive index, the bulk body of the inorganic phosphor and the bulk body of the resin having the shape suitable for the measurement may be used.

$$n^2-1=A\lambda^2/(\lambda^2-B) \qquad (6)$$

(In the above equation, n is the refractive index at the wavelength λ, and A and B are constants.)

The production method of said resin composition is not particularly limited; however the specific production method will be described as an example.

First, the inorganic phosphor particles are mixed with the liquid or viscous resin precursor. For the mixing procedure, the mixer of known type such as a propeller mixer, a planetary mixer, or a butterfly mixer or so can be used without particular limitation.

Next, the bubble generated in the resin precursor during the mixing procedure is defoamed. During such defoaming procedure, the defoaming apparatus such as a vacuum defoaming apparatus, or a centrifugal defoaming apparatus or so can be used without particular limitation. By carrying out such defoaming procedure, the light scattering due to the bubbles can be suppressed; hence the transparency of the resin composition can be enhanced.

Note that, during said mixing procedure and the defoaming procedure, in order to reduce the viscosity of the resin precursor and to efficiently carry out the mixing and the defoaming, the organic solvent may be added to the resin precursor.

Next, the obtained mixture of the inorganic phosphor particles and the resin precursor is introduced into the mold with desired shape to cure the resin precursor. The method for curing is not particularly limited; however the method of polymerizing the resin precursor by heat applying, ultraviolet irradiation or catalysis addition or so is preferable.

In the present invention, the neutron scintillator is preferably further mixed with the phosphor which does not comprise the neutron-capturing-isotope (hereinafter, it may be also referred as the neutron insensitive phosphor) in addition to the inorganic phosphor particles and the resin.

In such embodiment, the high speed electrons generated by γ ray incident provides the energy when reaching the neutron insensitive phosphor after deviating from said inorganic phosphor particles, thereby the neutron insensitive phosphor will fluoresce. That is, upon γ ray incident, the inorganic phosphor particles and the neutron insensitive phosphor are both provided with the energy; thereby these will fluoresce. On the other hand, upon neutron incident, the secondary particles generated by the inorganic phosphor particles do not deviate from the inorganic phosphor particles; hence only the inorganic phosphor particles fluoresce.

Here, by using the neutron insensitive phosphor having different fluorescence characteristic such as a fluorescence lifetime or the light emitting wavelength or so from said inorganic phosphor particles, neutrons and γ ray can be discriminated using the said differences in the fluorescence characteristics. That is, the mechanism which can recognize the fluorescence characteristic differences is provided to the neutron detector, thereby when the fluorescence derived from the inorganic phosphor particles and the fluorescence derived from the neutron insensitive phosphor are both detected, it can be processed as the event of γ ray incident; and when only the fluorescence derived from the inorganic phosphor particles is detected, then it can be processed as the event of neutron incident. By going through such process, the neutron detector having excellent n/γ discrimination ability can be obtained.

As for specific examples of the mechanism which can recognize the differences of the fluorescence characteristics, the waveform analysis mechanism which can recognize the difference of the fluorescence lifetime between said inorganic phosphor particles and the neutron insensitive phosphor, and the wavelength analysis mechanism which can recognize the difference of the light emitting wavelength between the inorganic phosphor particles and the neutron insensitive phosphor or so may be mentioned.

Hereinbelow, said waveform analysis mechanism will be described further specifically. The waveform analysis mechanism comprises the preamplifier, the main amplifier, the waveform analyzer and the time-to-amplitude converter.

For the neutron detector of the present invention made by combining with said neutron scintillator and the photodetector, the signal output from the photodetector is input to the main amplifier via the preamplifier; thereby amplification and shaping are carried out. Here, amplification and shaping are carried out by the main amplifier, and the intensity of the signal output from the main amplifier increases over the time, however the time necessary for the increase (hereinafter, it may be referred as the rise time) reflects the fluorescence lifetime of said inorganic phosphor particles or the neutron insensitive phosphor, and the shorter the fluorescence lifetime is, the shorter the rise time is.

In order to analyze the rise time, the signal being amplified and shaped by the main amplifier is input to the waveform analyzer. The waveform analyzer time-integrates the signal input from said main amplifier, and output the logic signal when the signal intensity being time-integrated exceeds the predetermined threshold. Here, two steps of the thresholds are set in the waveform analyzer; and these are output as the first logic signal and the second logic signal with time interval.

Next, two logic signals output from the waveform analyzer are input to the time-to-amplitude converter (TAC), then the time difference of two logic signals output from the waveform analyzer are output by converting to the pulse amplitude. The pulse amplitude reflects the time intervals between the first logic signal and the second logic signal which are output from the waveform analyzer, that is, it reflects the rise time.

As it can be understood from the above, the smaller the pulse amplitude output from the time-to-amplitude converter is, the shorter the rise time is, and therefore it is recognized that the fluorescence lifetime of said inorganic phosphor particles or the neutron insensitive phosphor is short.

Hereinafter, said wavelength analysis mechanism will be described further specifically. The wavelength analysis mechanism comprises the optical filter, the second photodetector connected to the neutron scintillator via said optical filter, and the discrimination circuit.

In the present embodiment, a part of the light released from the neutron scintillator is guided to the first photodetector without going through said optical filter, and other parts of the light is guided to the second photodetector via the optical filter.

Here, the inorganic phosphor particles emit the light in the wavelength of A nm, and the neutron insensitive phosphor emits the light in the wavelength of B nm which is different from A nm. Then, as discussed in the above, the inorganic phosphor particles and the neutron insensitive phosphor both emit the fluorescence upon γ ray incident, hence the light of A nm and B nm will be emitted from the neutron scintillator; but the inorganic phosphor particles will only emit the fluorescence upon the neutron incident, thus the light of A nm will only be emitted.

In the present embodiment, said optical filter is the filter which blocks the light having the wavelength of A nm, and transmits the light having the wavelength of B nm. Therefore, the light of A nm emitted from the neutron scintillator when neutrons are irradiated will reach the first photodetector, but it will not reach the second photodetector because it is blocked by optical filter. On the other hand, among the lights emitted from the scintillator when γ ray was irradiated, it is the same for the light of A nm such as in case of said neutron irradiation, however the light of B nm will reach the first photodetector, and it will also reach to the second photodetector since it can transmit through the optical filter.

Therefore, when the light of A nm enters to the first photodetector and outputs the signal from said photodetector, it will be considered as the event of neutrons if the signal from the second photodetector is not output; however when the light of B nm enters the second photodetector and outputs the signal from the second photodetector, then it can be considered as the event of γ ray; thereby it can be discriminated.

Note that, in the present embodiment, as mentioned in the above, the discrimination circuit is provided to discriminate neutrons and γ ray. The discrimination circuit works by synchronizing to the signal from said first photodetector; and it is the circuit to determine whether the signal is from the second photodetector when the signals are output from the photodetector. As the specific examples of the discrimination circuits, the anticoincidence circuit and the gate circuit or so may be mentioned.

As for specific examples of the neutron insensitive phosphor, 2,5-Dipheniloxazole, 1,4-Bis(5-phenyl-2-oxazolyl)benzene, 1,4-Bis(2-methylstyryl)benzene, anthracene, stilbene and naphthalene, and the organic phosphor of derivatives thereof or so may be mentioned. Said organic phosphor generally has shorter fluorescence lifetime compared to said inorganic phosphor particles, hence it can be suitably used to improve the n/γ discrimination ability by using the different fluorescence lifetime.

The content of the neutron insensitive phosphor can be set appropriately within the range which can exhibit the effect of the present invention, however preferably it is 0.01 wt % or more, and particularly preferably 0.1 wt % or more with respect to the resin. By making the content to 0.01 wt % or more, the neutron insensitive phosphor can be excited efficiently by the energy provided from said high speed electrons, and the intensity of the light emission from the neutron insensitive phosphor increases. Also, the upper limit of the content of the neutron insensitive phosphor is not particularly limited, however in order to prevent the light emission intensity of the neutron insensitive phosphor from declining due to the concentration quenching, it is preferably 5 wt % or less and particularly preferably 2 wt % or less with respect to the resin. By setting the content of the neutron insensitive phosphor within the range, the light emission intensity from the neutron insensitive phosphor increases, and neutrons and γ ray becomes easy to discriminate by using the difference of the fluorescence characteristics from said inorganic phosphor particles.

In the present invention, when the neutron scintillator is constituted from one resin composition, as discussed in above, by limiting the average diameter of the inscribed sphere of the resin composition, that is the average thickness of the layer form resin composition, or the average diameter of the column form resin composition within said range, the desired neutron detection efficiency may not be obtained in some cases. In such case, by using the resin based complex wherein plurality of parts made of the resin composition (hereinafter, it will be referred as the resin composition part) are arranged via the supplementing part, the desired neutron detection efficiency can be obtained.

In such embodiment, it is important that plurality of the resin composition parts are arranged appropriately, so that the total sum of the light yield does not increase due to the high speed electrons deviating from one resin composition part entering to other resin composition part close thereto and providing the energy to the inorganic phosphor particles in the resin composition. According to the examination by the present inventors, by making the ratio of the distance between the centers of two inscribed spheres with respect to a sum of diameter of said two inscribed spheres of the plurality of the resin composition parts to 1.2 or more, the increase of the light yield can be suppressed which is caused by said high speed electrons providing the energy across the plurality of the resin composition parts.

Figure 2:
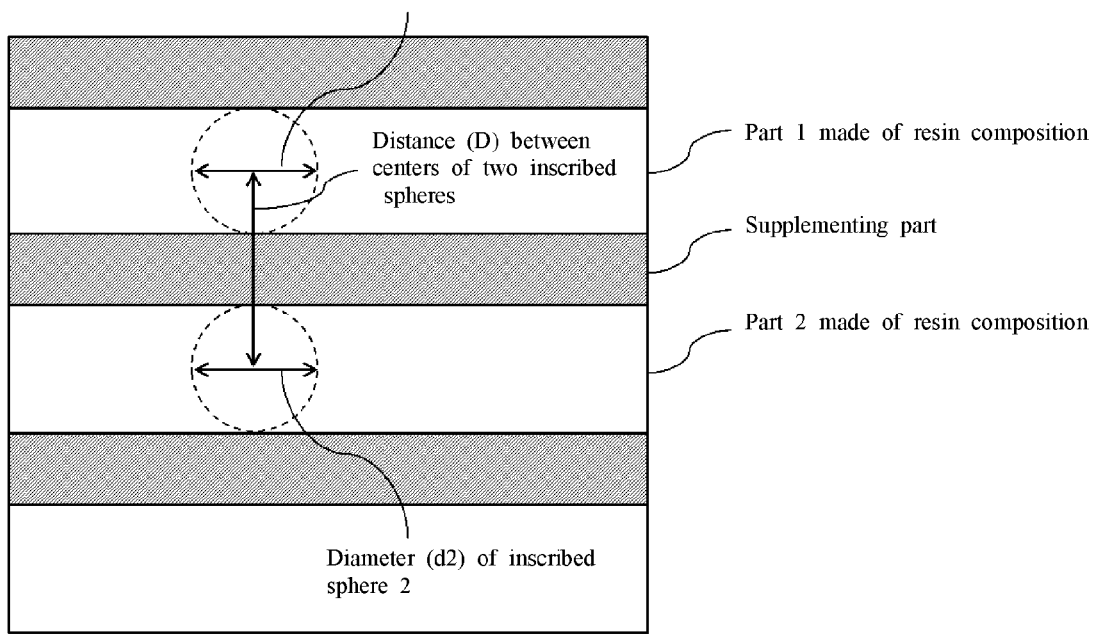
FIG. 2 is the schematic diagram showing the structure of the resin based complex of the present invention.
Figure 3:
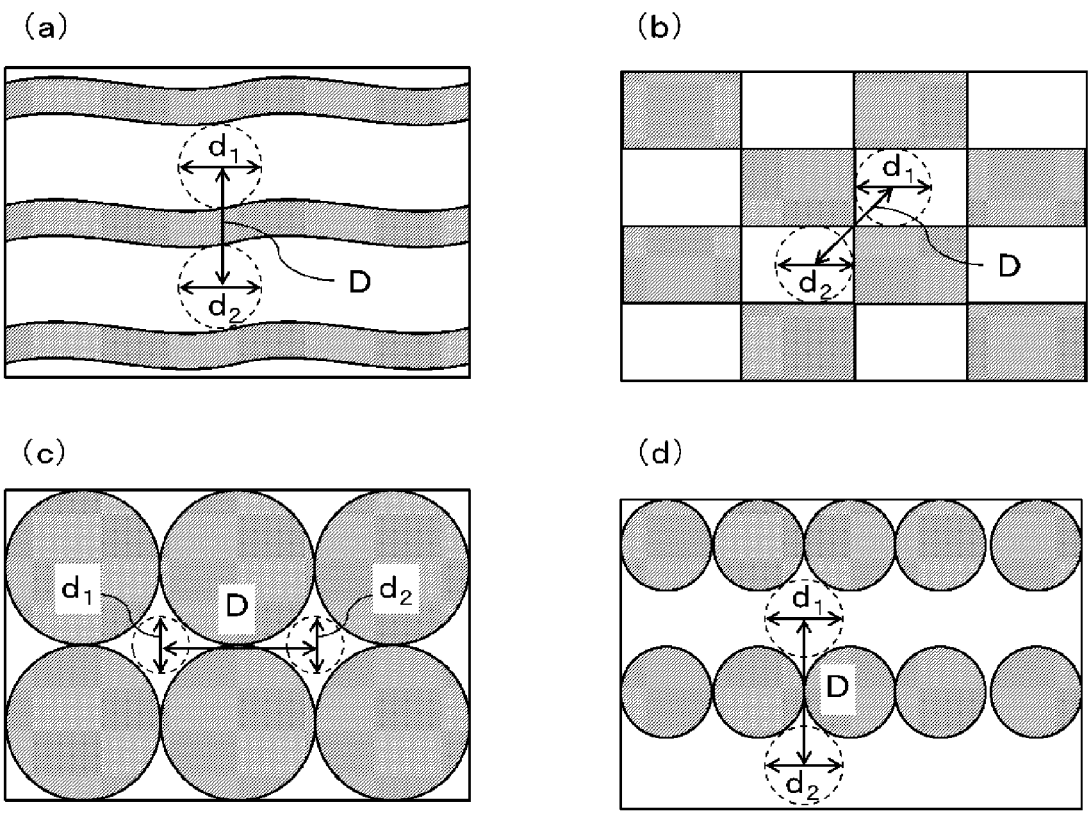
FIG. 3 is the schematic diagram showing the structure of the resin based complex of the present invention.

The ratio of the distance of the centers of two inscribed spheres against the sum of diameter of said two inscribed spheres of the plurality of the resin composition parts will be described in detail using FIG. 2. The diameter of the inscribed sphere 1 of one resin composition part 1 is set as $d_1$, and the diameter of the inscribed sphere 2 of the resin composition part 2 which is closest to the inscribed sphere 1 is set as $d_2$. Then, the distance (D) between the centers of said inscribed sphere 1 and the inscribed sphere 2 satisfies the below equation (7). FIG. 2 describes the resin composition part of the layered form; however the same applies to the resin composition in different forms as well (refer to FIG. 3).

$$D/(d_1+d_2) \geq 1.2 \qquad (7)$$

By using such indicator, the resin composition part having various shapes can be arranged appropriately. When the shape of the resin composition is small and the diameter of the inscribed sphere thereof is small, the energy provided to the resin composition part by the high speed electrons is small, since the high speed electrons allows providing the energy across the plurality of the resin composition part to some degree, thus the distance between the centers of the inscribed spheres is made short and other resin composition part can be arranged at the position close thereto. On the other hand, when the shape of resin composition part is large and the diameter of the inscribed sphere thereof is large, since the energy provided to the resin composition part by the high speed electrons is large, the distance between the centers of said inscribed spheres are made long and it is necessary to arrange other resin composition part further away. Also, when the shape of the resin composition part is as shown in (b), (c) and (d) of said FIG. 3, the adjacent resin composition parts are in contact against each other, however the possibility of providing a large energy through the contact point by the high speed electrons is rare, thus the plurality of the resin composition parts are arranged so that the distance between the centers of said inscribed spheres falls within said range, thereby the desired n/γ discrimination ability can be obtained.

Note that, the ratio of the distance between the centers of two inscribed spheres against the sum of diameters of said two inscribed spheres of the plurality of the resin composition parts is preferably 1.5 or more and particularly 2 or more from the point of further enhancing the n/γ discrimination ability. Also, it only needs to be within said range in average, and as long as it does not compromise the effect of the present invention, a part of it may be below said range, and the adjacent resin compositions may be adhered against each other in some parts.

The upper limit of the ratio of the distance between the centers of two inscribed spheres against the sum of diameter of said two inscribed spheres is not particularly limited, however if said ratio is excessively large, the size of the resin based complex becomes large, thus in case the size of the scintillator is limited, said ratio is preferably 5 or less, and particularly preferably 2.5 or less.

In the present invention, the supplementing part is a spacer for appropriately arranging the plurality of the resin composition parts, and the material thereof is not particularly limited. Specifically, the bubbles of the air or so, the liquid of oils or so, and the solids of resin or glasses or so may be used without limitation.

For the supplementing part, those having the refractive index at the light emission wavelength of said inorganic phosphor particles which is close to the refractive index of the resin constituting the resin composition part is preferably used. Specifically, the ratio of the refractive index of the supplementing part with respect to the refractive index of the resin constituting said resin composition part is preferably 0.90 to 1.10, particularly preferably 0.95 to 1.05 and most preferably 0.98 to 1.02. By setting the ratio of the refractive index of the supplementing part within said range, the light scattering at the boundary between the supplementing part and the resin constituting the resin composition part can be suppressed, thus the transparency of said resin based complex can be enhanced. Note that, the refractive index is the refractive index at the temperature range of which the scintillator of the present invention is used. For example, when using the scintillator of the present invention around 100° C., then the refractive index needs to be determined at 100° C.

In order to make the ratio of the refractive index of the supplementing part within said range, the liquid of so called matching oil, and the solids of resin or glasses having the refractive index close to the resin constituting the resin composition part, or those added with the additives are suitable.

As said supplementing part, those comprising substantially the same resin as the resin constituting said resin composition part is most preferable. By using such supplementing part, the refractive index of the supplementing part and the resin constituting the resin composition part can be matched, and also the peeling between the resin composition part and the supplementing part rarely occurs, thus the resin based complex with excellent durability can be obtained.

In the present invention, the supplementing part comprises the neutron-capturing-isotope as same as the resin composition part; and when the content of the neutron-capturing-isotope of the supplementing part in the resin based complex is equal to the content of the neutron-capturing-isotope of the resin composition part, the neutron detection efficiency may decline. That is, the neutron-capturing-isotope included in the supplementing part competes against the neutron-capturing-isotope included in said resin composition part; thereby the neutron-capturing-isotope in the supplementing part generates the neutron capturing reaction in some of the neutron incident events. In such events, the light emission from the inorganic phosphor particle in the resin composition cannot be obtained, thus the counting loss of the neutron occurs.

Therefore, in the present invention, in order to obtain particularly excellent neutron detection efficiency, the supplementing part having low content of the neutron-capturing-isotope is used. Specifically, the content of the neutron-capturing-isotope of the supplementing part is ½ or less of the content of the neutron-capturing-isotope of the resin composition part, and more preferably ⅕ or less, and particularly preferably ¹⁄₁₀ or less. The content of lithium 6 and boron 10 of the supplementing part can be obtained as same as the case of said resin composition.

In the present invention, said neutron insensitive phosphor can be added to the supplementing part. As for the suitable embodiment of adding the neutron insensitive phosphor and the effect thereof, it is the same as discussed in the above. Also, among the neutron insensitive phosphor, the phosphor which absorbs the light emission from the inorganic phosphor particles and then re-emits the light may be used. By using such phosphor, and by setting the refractive index of the supplementing part higher than the refractive index of the resin constituting the resin composition, the supplementing part can function as the waveguide for guiding the light emission from the inorganic phosphor particles to the photodetector, hence it is suitable.

In the present invention, said resin based complex has preferably the layered structure wherein the part made of resin composition and the supplementing part are stacked in an alternating manner. By taking such layered structure, the neutron scintillator having uniform characteristic can be obtained. Also, by employing the below described production method, the production can be done at low cost.

The production of the resin based complex having the layered structure will be described in detail. First, as same as the production method of said resin composition, the inorganic phosphor particles and the liquid or solid resin precursor are mixed, and then defoamed. Next, the obtained mixture of the inorganic phosphor particle and the resin precursor is introduced into the mold of desired shape, and the inorganic phosphor particles are precipitated by leaving it still. Thereby, the layer of the resin composition part is formed at the bottom part, and the layer of the supplementing part made of the same resin as the one constituting the resin composition part is formed at the upper part. Then, the resin precursor is cured as same as the production method of said resin composition. By repeating such procedure, the resin based complex having the layered structure can be easily obtained. In said production method, by regulating the mixing ratio between the inorganic phosphor particles and the resin precursor, and by regulating the introduction amount to the mold per one time; the average diameter of the inscribed sphere of said resin composition part and the ratio between the center of two inscribed spheres against the sum of the diameter of said two inscribed spheres of the plurality of the resin composition parts can be set to a desired value.

Other than the above mentioned production method, the method of producing the plurality of the layered form resin compositions in advance and adhering these via the supplementing part can be used as the suitable production method of the resin based complex having the layered structure. Also, for the resin based complex having other structures, the method of arranging the plurality of the resin composition produced in advance and introducing the supplementing part into the space therebetween; or the method of arranging the supplementing part, and introducing the mixture of the inorganic phosphor particles and the resin precursor into the space therebetween then curing the resin precursor can be employed accordingly.

Here, the neutron scintillator comprising the resin composition and the resin based complex of the present invention can be molded by the mold having the desired shape, thus it is easy to make into any shape. Therefore, according to the present invention, the neutron scintillator having a fiber form, a hollow tube form, or with a large area can be provided depending on the purpose of use.

The neutron detector of the present invention is made by combining said neutron scintillator and the photodetector. That is, the light emitted from the neutron scintillator due to the neutron incident is converted into an electrical signal by the photodetector, and the neutron incident is counted as the electrical signal, thus it can be used for the neutron counting or so. In the present invention, the photodetector is not particularly limited, and the conventionally known photodetector such as a photomultiplier tube, photodiode, avalanche photodiode, Geiger mode avalanche photodiode or so can be used without any particular limitation.

Note that, the neutron scintillator comprises the light emission face facing the photodetector, and preferably the light emission face is a smooth face. By having such light emission face, the light generated by the neutron scintillator can efficiently enter into the photodetector. Also, to the face which is not facing photodetector, the light reflection membrane made of aluminum or polytetrafluoroethylene or so is applied, thereby the dissipation of the light generated by the neutron scintillator can be prevented and thus it is preferable.

The method of producing the neutron detector by combining the neutron detector and the photodetector of the present invention is not particularly limited, and for example optically coupling the light emission face of the neutron scintillator by an optical grease or an optical cement to the light detection face of the photodetector, and then by connecting the power source and a signal reading circuit to the photodetector thereby the neutron detector can be produced. Note that, said signal reading circuit is generally constituted from the preamplifier, the shaping amplifier and the multiple pulse height analyzer or so.

Also, by aligning numbers of neutron scintillators applied with said light reflection layer, and by using the position sensitive photodetector as the photodetector, the position resolution can be provided to the neutron detector.

EXAMPLE

Here, the present invention will be described in detail by referring to the examples; however the present invention is not to be limited thereto. Also, the characteristic combination described in the examples is not necessarily the essential feature for attaining the present invention.

Example 1

In the present invention, the neutron detector was produced using the inorganic phosphor particles made of Eu:LiCaAlF$_6$ crystal doped with 0.04 mol % of Eu.

The Eu:LiCaAlF$_6$ crystal comprises only lithium 6 as the neutron-capturing-isotope. The density of the Eu:LiCaAlF$_6$ crystal was 3.0 g/cm$^3$, the weight fraction of lithium was 3.2 wt %, and the isotope ratio of lithium 6 in the source material was 95%, therefore the content ($C_{Li\_p}$) of the neutron-capturing-isotope thereof was $9.1 \times 10^{18}$ atom/mm$^3$ according to the aforementioned equation (1).

Also, the radiation was irradiated to the Eu:LiCaAlF$_6$ crystal and the light emission wavelength of the Eu:LiCaAlF$_6$ crystal measured by the fluorescence photometer was 370 nm. Note that, the radiation was α ray which is one of the secondary particles generated at the neutron irradiation, and $^{241}$Am was used as the radiation source.

When producing the inorganic phosphor particles made of Eu:LiCaAlF$_6$ crystal, first the bulk body of said Eu:LiCaAlF$_6$ crystal having an indefinite shape of about 2 cm square was prepared, then after pulverizing the bulk body by hummer mill, the dry classification was carried out to collect those passed through the upper filter of 300 μm and remained at the lower filter of 150 μm thereby the inorganic phosphor particles having indefinite form were obtained.

When the weight based specific surface area of the inorganic phosphor particles were measured using BET specific surface area meter, it was 0.01 m$^2$/g. Therefore, the surface area per unit volume was 300 cm$^2$/cm$^3$.

In the present example, the silicone resin (KER-7030 made by Shin-Etsu Chemical Co., Ltd) was used as the resin. The resin was formed of 2 solutions that of A solution and B solution, and the equal amount of 2 solutions were mixed to prepare the resin precursor, then the resin precursor can be used for heat-curing. Also, the resin was the transparent resin having the internal transmittance of 95%/cm at 370 nm which is the light emission wavelength of said Eu:LiCaAlF$_6$ crystal.

The refractive index of said Eu:LiCaAlF$_6$ crystal and said silicone resin at 370 nm under the room temperature was measured by the refractometer. Note that, for the measurement of the refractive index, the bulk body of Eu:LiCaAlF$_6$ crystal having predetermined shape suitable for the measurement and the bulk body of the resin were used. As the light source of the refractometer, i ray (365.0 nm) and h ray (404.7 nm) of Hg lamp were used. The wavelength of each light source and the refractive index measured at said wavelength were input to said Sellmeier's equation (6) to obtain the constants A and B, then the refractive index at 370 nm was obtained using the same equation. As a result, the refractive index of Eu:LiCaAlF$_6$ crystal and the silicone resin at 370 nm were 1.40 and 1.41 respectively; and the ratio of the refractive index of the transparent resin against the refractive index of the inorganic phosphor particles was 1.01.

4.1 g of the inorganic phosphor particle made of said Eu:LiCaAlF$_6$ crystal and 3.0 g of the resin precursor of the silicone resin wherein the equal amount of A solution and B solution were mixed in advance were placed in the mixing container. Then, thoroughly mixed using stirring rods, and the air bubbles generated in the mixture during the mixing procedure was defoamed using vacuum defoaming apparatus.

Next, 0.69 g of said mixture was introduced into the mold made of polytetrafluoroethylene of 20 mm square with the depth of 15 mm. Then, it was left still for 1 hour to precipitate the inorganic phosphor particles, and the resin precursor of the supernatant was removed, then the resin precursor was applied with the heat at 80° C. for 24 hours for curing, thereby the resin composition including the inorganic phosphor particles and the resin was obtained.

The shape of the resin composition was 20 mm square with the thickness of 0.7 mm, and the volume was 0.28 ml. Also, in the resin composition, 0.40 g of inorganic phosphor particles were included, and from the density of the inorganic phosphor particles, the volume thereof was 0.13 mL.

Thus, the volume fraction (V) of the inorganic phosphor particles against the resin composition was 48 vol %. Therefore, the content ($C_{Li, C}$) of the neutron-capturing-isotope derived from the inorganic phosphor particles in the resin composition was $4.3 \times 10^{18}$ atom/mm³.

The resin composition was cut in the thickness direction to cut out a thin specimen, and then the diameter of the inscribed sphere was measured by the observation using a polarizing microscope. As a result of arbitrary 100 measurements, the average diameter was 0.70 mm, and the maximum diameter was 0.82 mm (1.2 times of the average diameter).

The resin composition of 20 cm square with the thickness of 0.7 mm was produced separately, and the neutron scintillator made of the resin composition was connected to the photodetector, thereby the neutron detector of the present invention was produced. First, the face of 20 mm of said neutron scintillator was set as the light emission face and the light reflection layer was made by wrapping the tape form polytetrafluoroethylene to the face other than said light emission face. Then, the photomultiplier tube (H6521 made by Hamamatsu Photonics K.K.) as the photodetector was prepared, and after the light detection face of said photomultiplier tube and the light emission face of said neutron scintillator were optically coupled, then the neutron scintillator and the photodetector were covered by a black sheet for light shielding.

Said photomultiplier tube was connected to the power source, and the preamplifier, the shaping amplifier, and the multiple pulse height analyzer were connected as the signal reading circuit from the photomultiplier tube side, thereby the neutron detector of the present invention was obtained.

The performance of the neutron detector of the present invention was evaluated by the following method. Cf-252 having the radio activity of 2.4 MBq was placed at the center of the high density polyethylene having 20 cm cubic shape, and the neutron detector was placed so that the scintillator is arranged at the position close to the high density polyethylene, then neutron from the Cf-252 was irradiated by moderating by the high density polyethylene.

Using the power source connected to the photomultiplier tube, the high voltage of −1300 V was applied to the photomultiplier tube. By the neutron incident, the light emitted from the neutron scintillator was converted to the pulse form electrical signal by the photomultiplier tube, and the electrical signal was input to the preamplifier, shaping amplifier and multiple pulse height analyzer. The pulse height spectrum was made by analyzing the electrical signal which was input to the multiple pulse height analyzer.

Next, as same as the above, the pulse-height spectrum was made except that Co-60 having the radio activity of 0.83 MBq was placed at the position 5 cm from the neutron scintillator, and irradiating γ ray from said Co-60 in place of the neutrons. The dose of γ ray at the position 5 cm from Co-60 having the radio activity of 0.83 MBq was 10 mR/h which was extremely high dose.

Figure 4:
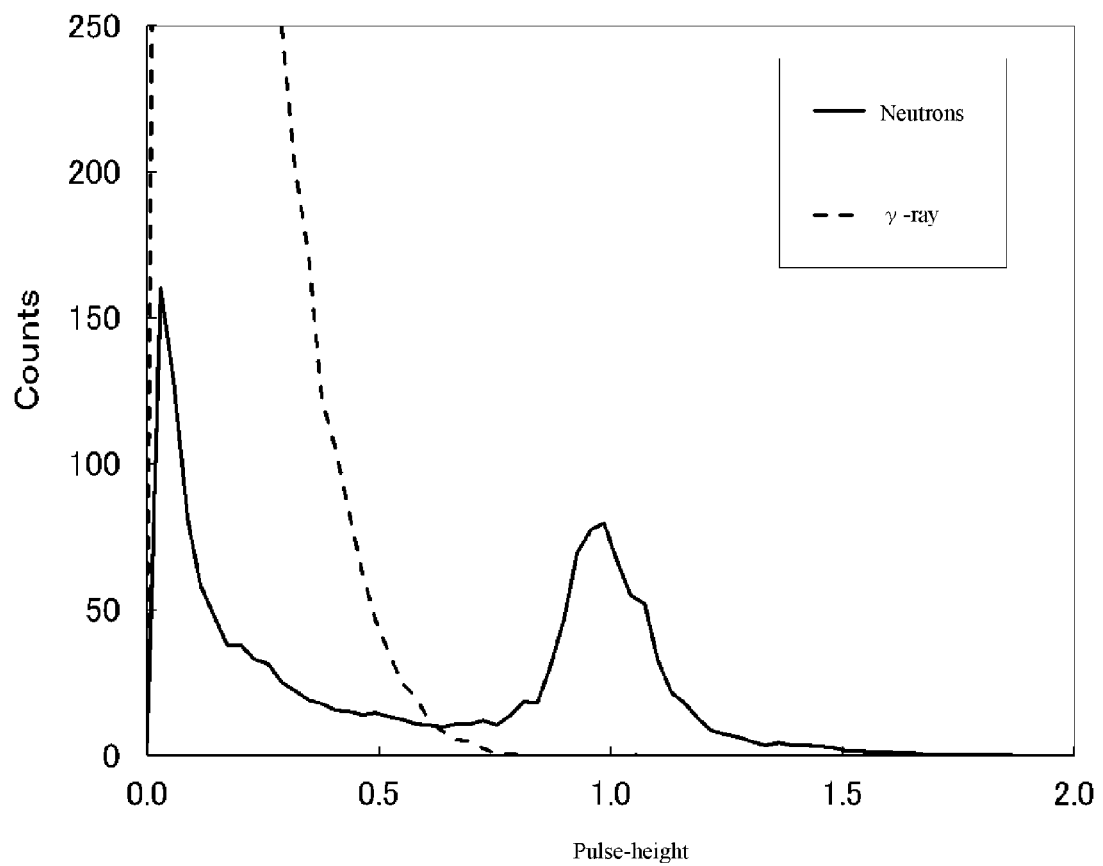
FIG. 4 is the pulse-height spectrum obtained from the example 1.

The obtained pulse-height spectrum is shown in FIG. 4. The bold line and the broken line of FIG. 4 are the pulse-height spectrum under neutrons and γ ray respectively. Note that, in said pulse-height spectrum, the horizontal axis is shown as the relative value taking the pulse-height of the neutron peak as 1.

A clear neutron peak can be confirmed from FIG. 4, and also the pulse-height of the electrical signal generated by γ ray incident is extremely low compared to the pulse-height of the neutron peak, thus it is obvious that γ ray and neutrons can be easily discriminated.

Examples 2 and 3, and Comparative Example 1

Figure 5:
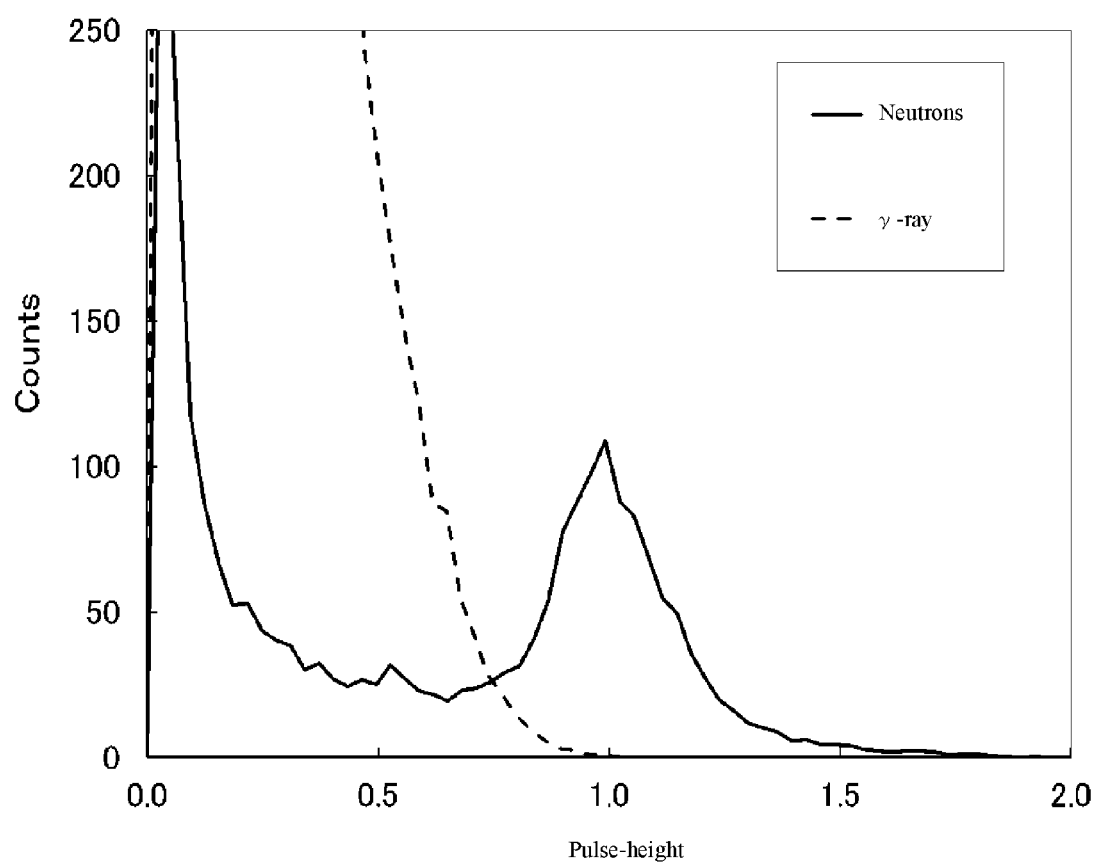
FIG. 5 is the pulse-height spectrum obtained from the example 2.
Figure 6:
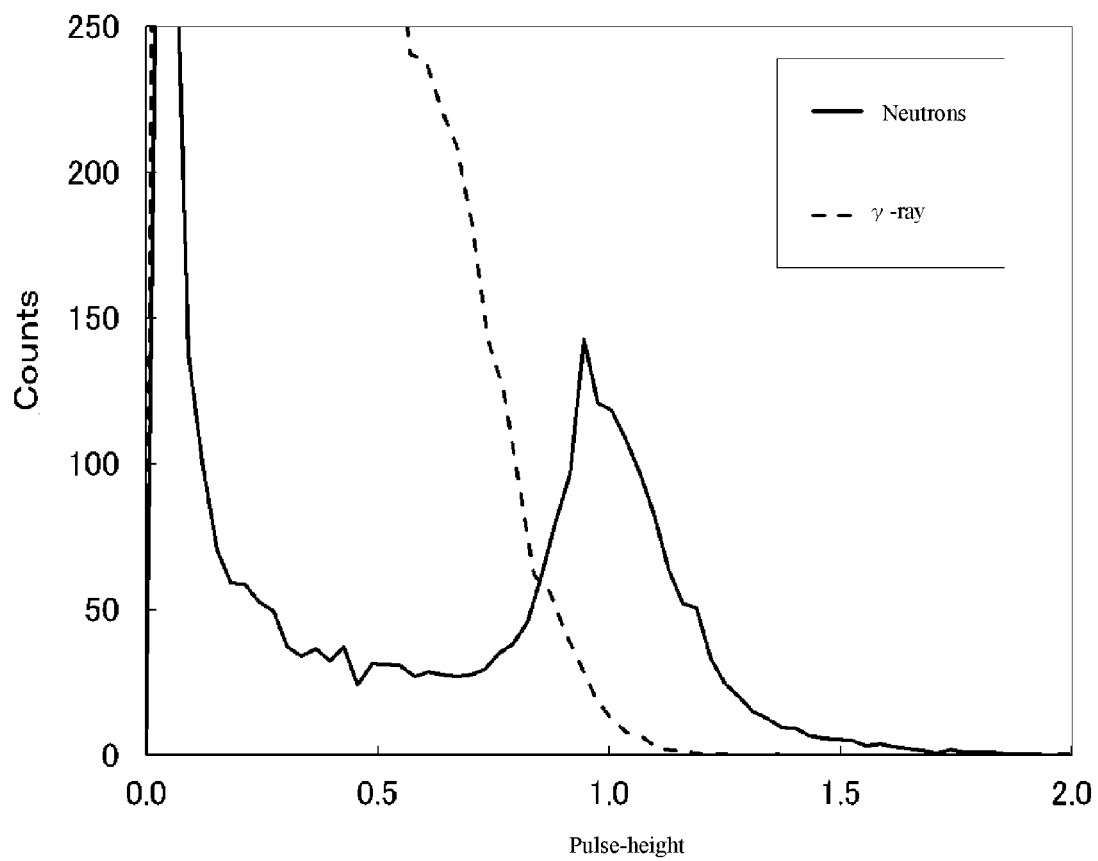
FIG. 6 is the pulse-height spectrum obtained from the example 3.
Figure 7:
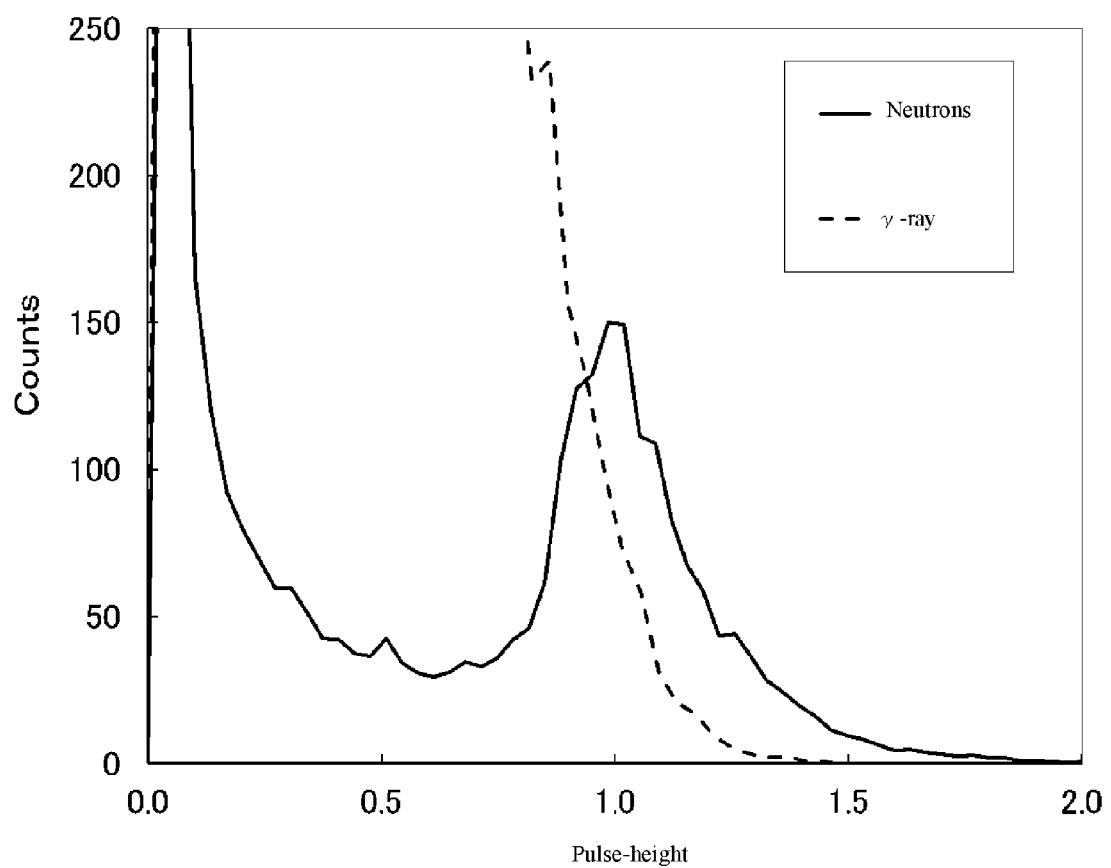
FIG. 7 is the pulse-height spectrum obtained from the comparative example 1.
Figure 8:
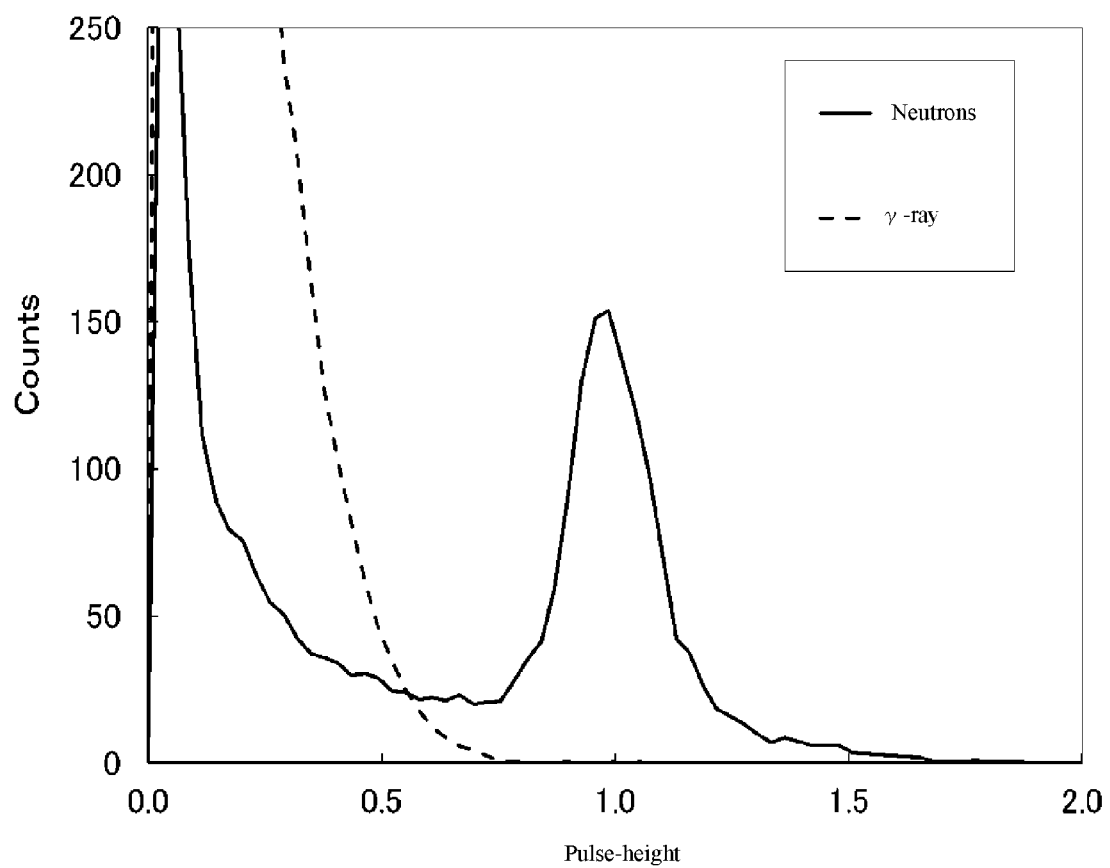
FIG. 8 is the pulse-height spectrum obtained from the example 4.
Figure 9:
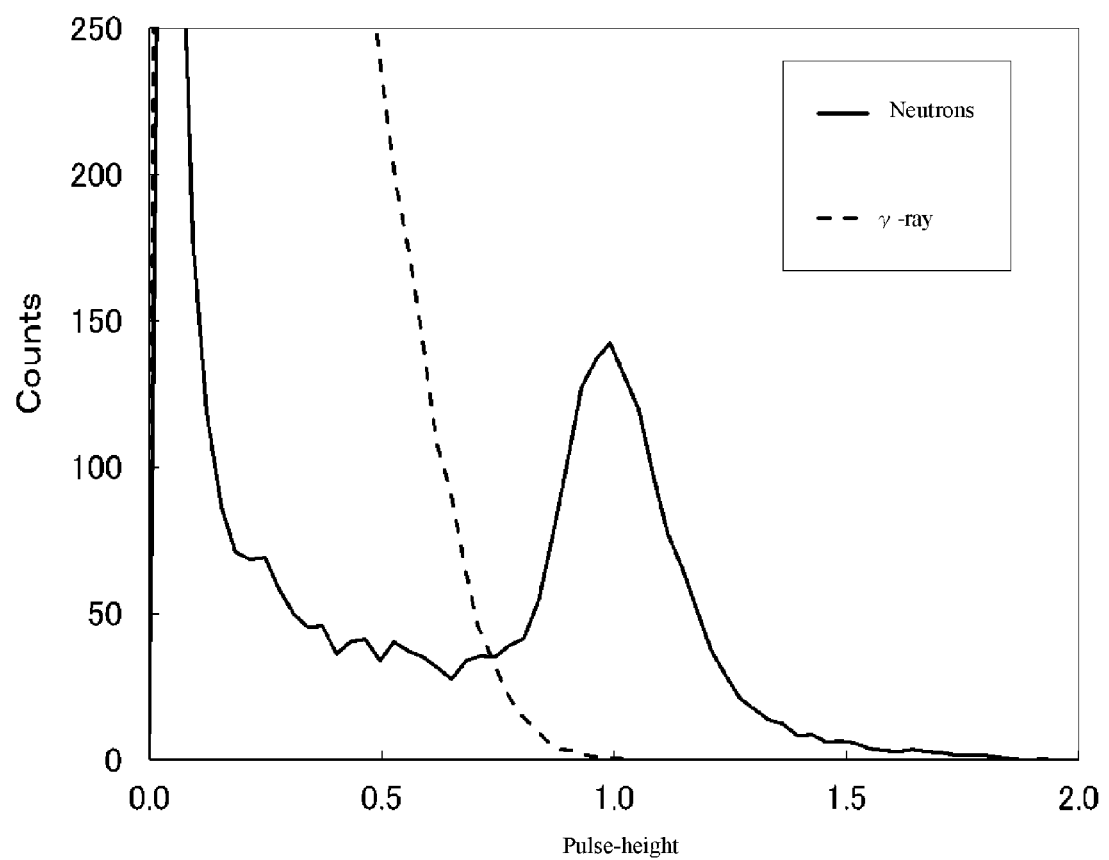
FIG. 9 is the pulse-height spectrum obtained from the example 5.
Figure 10:
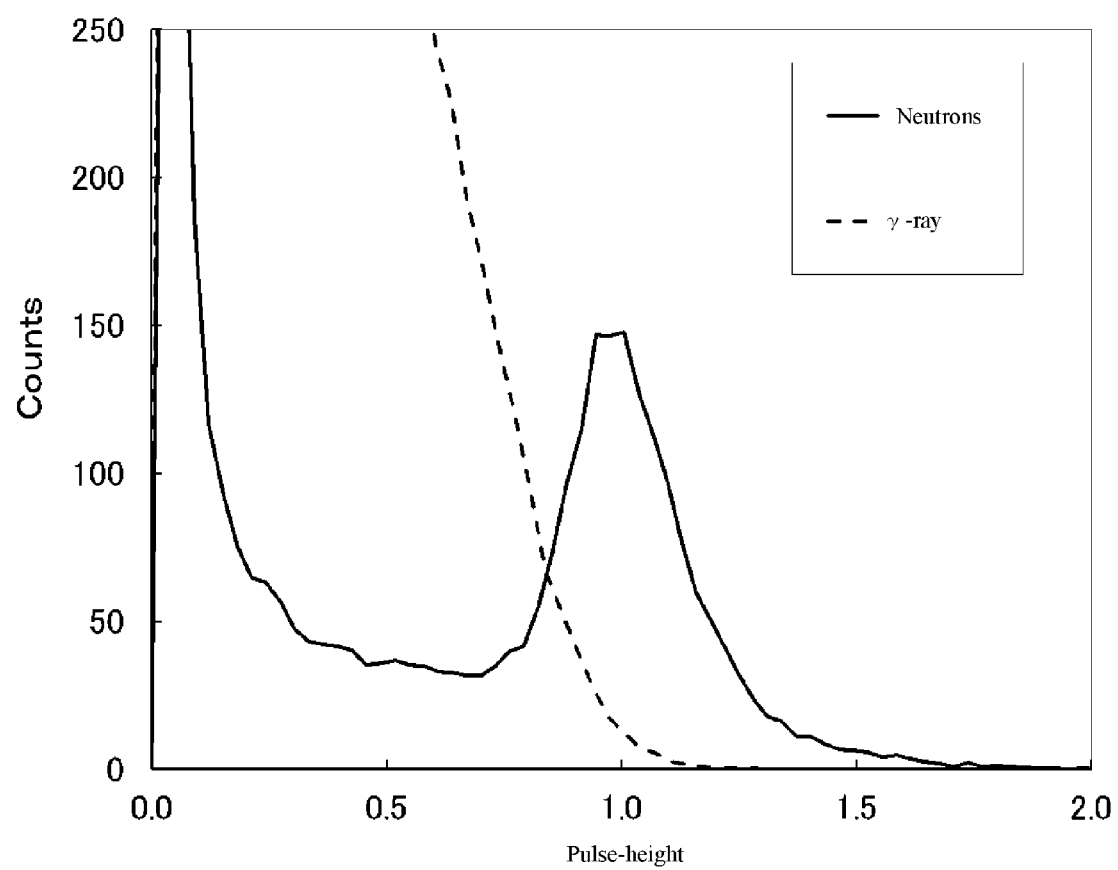
FIG. 10 is the pulse-height spectrum obtained from the example 6.
Figure 11:
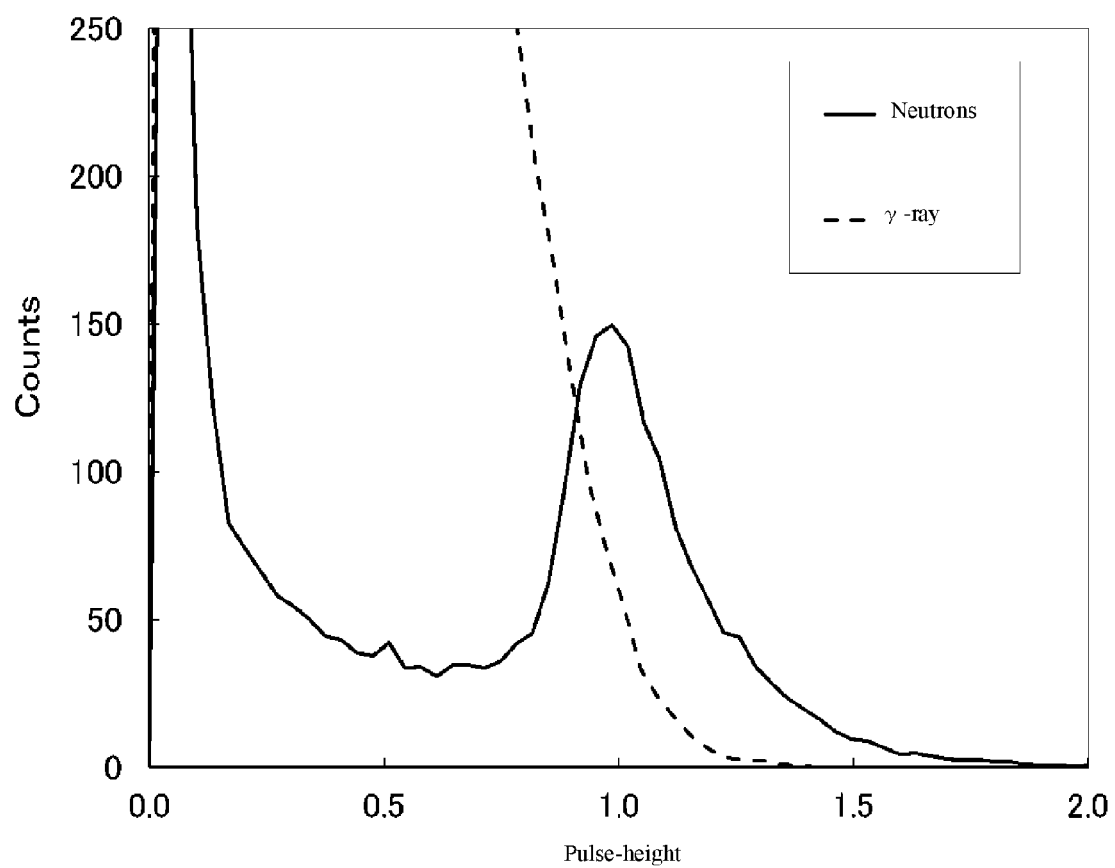
FIG. 11 is the pulse-height spectrum obtained from the comparative example 1.

In the examples 2 and 3, and the comparative example 1, the amount of mixture made of said inorganic phosphor particles and the resin precursor introduced into the mold were set to 1.38 g, 3.46 g and 5.54 g respectively, other than that the resin composition was produced as same as the example 1. The content ($C_{Li, C}$) of the neutron-capturing-isotope derived from the inorganic phosphor particles in the resin composition was obtained as same as the example 1. Each result was $4.3 \times 10^{18}$ atom/mm³. The diameter of the inscribed spheres of these resin compositions were measured as same as the example 1 and are shown in Table 1; and the pulse-height spectrums obtained by producing the neutron detector using the resin composition are shown in FIGS. 5, 6 and 7.

By comparing FIG. 4 to 7, it is apparent that as the average diameter of the inscribed sphere of the resin composition becomes larger, the neutron detection efficiency improves; however when the pulse-height of γ ray becomes large and the average diameter of the inscribed spheres exceeds 5 mm, the counting error due to γ ray becomes extremely prominent.

Examples 4, 5, 6 and Comparative Example 2

The amount of the inorganic phosphor particles and the resin precursor were set as shown in Table 2 and mixed as same as the example 1, then defoamed. Next, the mixture in the amount shown in Table 2 was introduced into the mold made of polytetrafluoroethylene of 20 mm square with the depth of 15 mm. After it was left still for 1 hour to precipitate the inorganic phosphor particles, the resin precursor was applied with a heat at 80° C. for 24 hours for curing. The procedure was repeated for total of 8 times, thereby the resin based complex was obtained. The resin based complex obtained in the examples 4, 5 and 6, and in the comparative example 2 were 20 mm square, and the thickness was about 13 mm, about 10 mm, about 8 mm and about 6 mm respectively.

The resin based complex was cut in the thickness direction to cutout the thin specimen, and when observing using polarizing microscope, the resin based complex of layered structure was confirmed wherein 8 pairs of the resin composition part including the inorganic phosphor particles and the supplementing part which does not include the inorganic phosphor particles are stacked in an alternating manner. The measurement of the diameter of the inscribed sphere at the resin composition part was carried out under the observation by polarizing microscope; and the ratio of the distance between the centers of the two inscribed spheres against the total sum of the diameter of the inscribed sphere of the plurality of the resin composition parts was carried out. Arbitrary 100 measurements were carried out, and the results are shown in Table 2.

Using the resin based complex obtained from the examples 4, 5, and 6, and the comparative example 2, the neutron detector was produced as same as the example 1, and the obtained pulse-height spectrum are respectively shown in FIGS. 8, 9, 10 and 11.

By comparing FIG. 8 to 11, it is apparent that the pulse-height of γ ray becomes larger when the ratio the distance between the centers of the two inscribed spheres against the total sum of the diameter of the inscribed sphere of the plurality of the resin composition parts becomes smaller; and when said ratio is less than 1.2, the counting error due to γ ray becomes extremely prominent.

TABLE 1

| | Diameter of inscribed sphere of the resin composition | |
|---|---|---|
| | Average diameter | Maximum diameter |
| Example 1 | 0.7 | 0.81 |
| Example 2 | 1.4 | 1.68 |
| Example 3 | 3.51 | 4.38 |
| Comparative example 1 | 5.61 | 7.29 |

TABLE 2

| | Amoung of inorganic phosphor particles (g) | Amoung of resin (g) | Amoung introduced into molds (g) | Diameter of inscribed spheres of resin composition | | Ratio of distance between centers of two inscribed spheres |
|---|---|---|---|---|---|---|
| | | | | Average diameter | Maximum diameter | |
| Example 4 | 4.0 | 5.9 | 0.99 | 0.71 | 0.85 | 2.4 |
| Example 5 | 4.0 | 4.0 | 0.80 | 0.70 | 0.84 | 1.8 |
| Example 6 | 4.0 | 2.9 | 0.69 | 0.72 | 0.86 | 1.4 |
| Comparative example 2 | 4.0 | 2.0 | 0.60 | 0.72 | 0.86 | 1.1 |

The invention claimed is:

1. A neutron scintillator comprising:
a resin composition having a resin, and
inorganic phosphor particles having at least one neutron-capturing-isotope selected from the group consisting of lithium 6 and boron 10,
wherein a content of lithium 6 and boron 10 are 0.2 to 30×10$^{18}$ atom/mm$^3$ and 0.05 to 8×10$^{18}$ atom/mm$^3$ respectively; and
the resin composition has a shape so that an average diameter of inscribed spheres is 5 mm or less.

2. The neutron scintillator as set forth in claim 1 comprising:
a resin based complex having a part formed of the resin composition, and
a supplementing part of which a content of said neutron-capturing-isotope is ½ or less of said resin composition;
wherein the parts formed of the resin composition are present in plurality, and the ratio of the distance between centers of two inscribed spheres with respect to a sum of diameter of said two inscribed spheres is 1.2 or more.

3. The neutron scintillator as set forth in claim 2, wherein the supplementing part comprises substantially the same resin as the resin constituting the resin composition.

4. The neutron scintillator as set forth in claim 2 having a laminated structure wherein the part formed of the resin composition and the supplementing part are laminated in an alternating manner.

5. The neutron scintillator as set forth in claim 1, wherein a ratio of a refractive index of the resin constituting the resin composition with respect to the refractive index of the inorganic phosphor particle in an emission wavelength of the inorganic phosphor particle is within a range of 0.95 to 1.05.

6. The neutron scintillator as set forth in claim 5, wherein a ratio of a refractive index of the supplementing part with respect to the refractive index of the resin constituting the resin composition in the emission wavelength of the inorganic phosphor particle is within a range of 0.90 to 1.10.

7. The neutron scintillator as set forth in claim 1 wherein said inorganic phosphor particle has a size passing through a filter having an aperture of 1000 μm, but substantially free of the particle has a size passing through the filter having the aperture of 100 μm.

8. A neutron detector comprising the neutron scintillator as set forth in claim 1 and the photodetector.

* * * * *